United States Patent

Kumar et al.

[11] Patent Number: 6,104,148
[45] Date of Patent: Aug. 15, 2000

[54] SYSTEM AND METHOD FOR CONTROLLING AN AC TRACTION MOTOR WITHOUT SENSING MOTOR ROTATION SPEED

[75] Inventors: Ajith Kuttannair Kumar, Erie; Jeffrey Louis Daigle, North East, both of Pa.

[73] Assignee: General Electric Company, Erie, Pa.

[21] Appl. No.: 09/292,429

[22] Filed: Apr. 15, 1999

[51] Int. Cl.[7] .................................................. B01C 15/08
[52] U.S. Cl. ............................ 318/52; 303/151; 318/807
[58] Field of Search ....................... 318/52, 807; 303/151

[56] References Cited

U.S. PATENT DOCUMENTS

| | | | |
|---|---|---|---|
| 4,315,203 | 2/1982 | Ibamoto et al. | 318/807 |
| 4,348,627 | 9/1982 | Fulton | 318/807 |
| 4,757,248 | 7/1988 | Fujioka et al. | 318/807 |
| 4,896,090 | 1/1990 | Balch et al. | 318/52 |
| 5,334,923 | 8/1994 | Lorenz et al. | 318/805 |
| 5,365,158 | 11/1994 | Tanaka et al. | 318/806 |
| 5,480,220 | 1/1996 | Kumar | 301/151 |

*Primary Examiner*—Robert E. Nappi
*Assistant Examiner*—Ritor Leykin
*Attorney, Agent, or Firm*—Jill Breedlove; James H. Beusse

[57] ABSTRACT

A processor system and method are provided for providing motor excitation frequency control in a vehicle propelled by AC electric traction motors. The processor system and method allow for computing an excitation frequency signal based on a sum of i) a signal indicative of a weighted average of an estimated rotor speed signal and a measured vehicle speed signal and ii) a compensated slip command signal. Effective wheel slip control is thus provided without requiring sensors for measuring rotational speed of the traction motors.

23 Claims, 3 Drawing Sheets

… … …

SYSTEM AND METHOD FOR CONTROLLING AN AC TRACTION MOTOR WITHOUT SENSING MOTOR ROTATION SPEED

BACKGROUND OF THE INVENTION

The present invention is related to a system and method for providing control in a vehicle, such as a locomotive or a transit vehicle, propelled by traction motors, and, more particularly, to a system and method for providing motor excitation frequency control and wheel slip control without using sensors for measuring rotational speed of the motor.

Locomotives used for hauling applications have been generally equipped with speed sensors, e.g., electromechanical sensors or tachometers, coupled to respective traction motors or to the axles driven by the motors. The speed sensor data or information may be used to provide motor control since the speed information provided by the speed sensors may be readily used to derive a respective excitation frequency signal for the traction motors. It will be appreciated that the overall motor control reliability partly depends on the reliability of the speed sensors since if, for example, the reliability of the speed sensors is compromised, then the overall motor control reliability will be similarly compromised. It will be further appreciated that having to use such speed sensors adds to the overall cost of the motor control system in view of the cost of the sensors themselves and any associated wiring.

In view of the above, it would be desirable to provide a processor system using motor control techniques which would allow for computing the motor excitation frequency without having to use speed information from such speed sensors while maintaining effective wheel slip control. It would be further desirable to provide a processor system using motor control techniques no longer dependent on the reliability of electromechanical speed sensors and thus enhancing the overall reliability of the control system while resulting in reduced costs.

BRIEF SUMMARY OF THE INVENTION

A processor system provides motor excitation frequency control in a vehicle having wheels propelled by AC electric traction motors. The processor is designed to provide effective wheel slip control without having sensors coupled to measure rotational speed of the traction motors. The processor system comprises a processor module including a first processor submodule for computing an excitation frequency signal based on a sum of i) a signal indicative of a weighted average of an estimated rotor speed signal and a measured vehicle speed signal, and ii) a compensated slip command signal. The processor module may further include a second processor submodule for computing an estimated slip signal based on respective measured motor current signals and the excitation frequency signal. A slip compensation module is coupled to receive a slip command signal and is further coupled to the processor module to supply the compensated slip command signal. The compensation module includes a submodule for computing a slip compensation signal based on the estimated slip signal and the slip command signal.

A method is provided for controlling motor excitation frequency in a vehicle having wheels propelled by AC electric traction motors. The method provides effective wheel slip control without using sensors coupled to measure rotational speed of the traction motors. The method includes steps for computing an excitation frequency signal based on a sum of i) a signal indicative of a weighted average of an estimated rotor speed signal and a measured vehicle speed signal, and ii) a compensated slip command signal. The method further allows for computing an estimated slip signal based on respective measured motor current signals and the excitation frequency signal, and for computing a slip compensation signal based on a received slip command signal and the estimated slip signal.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
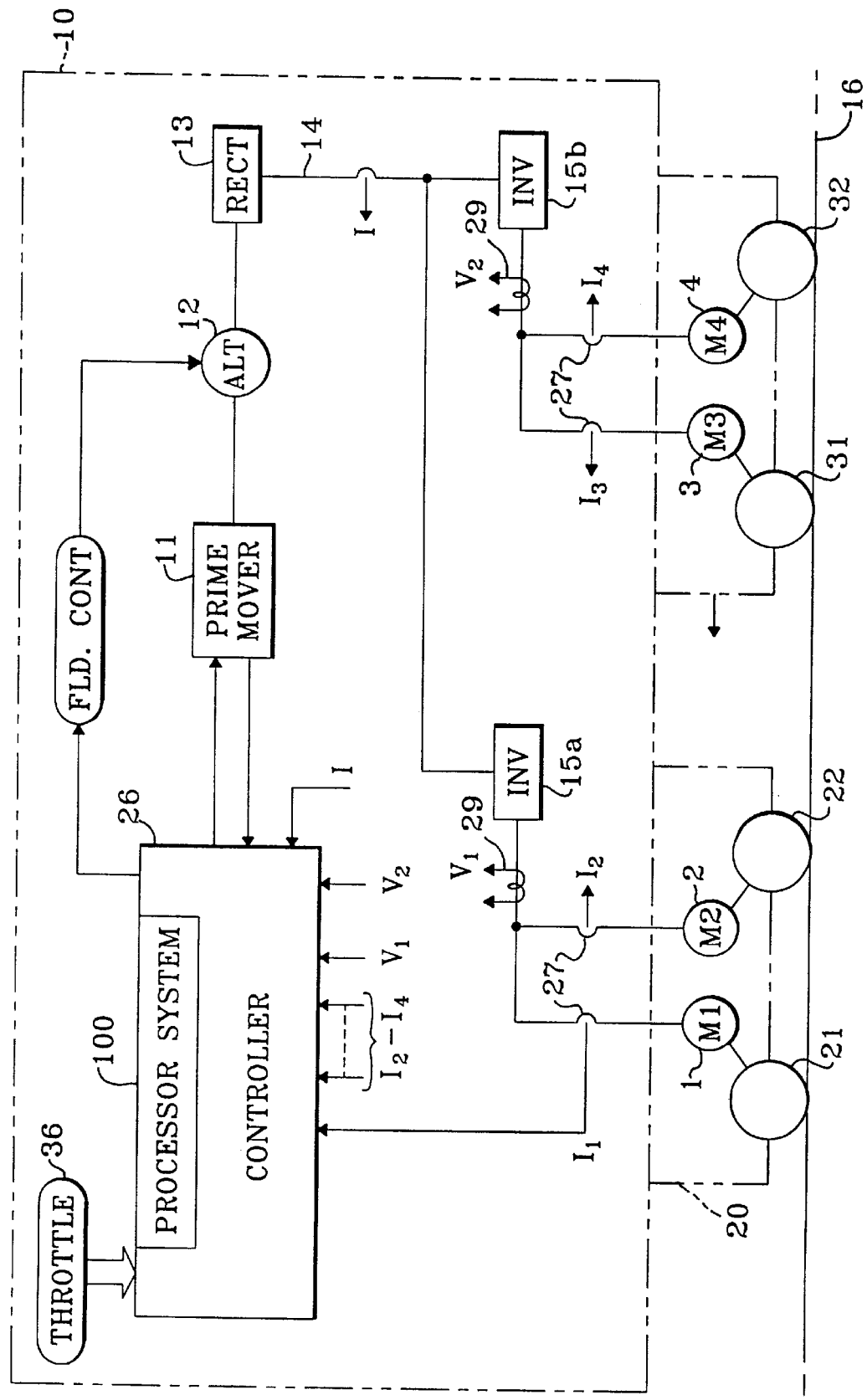
FIG. 1 shows a simplified block diagram of an exemplary propulsion system which could benefit by using a processor system in accordance with preferred embodiments of the present invention.

The present invention may be utilized in various types of alternating current (AC) induction motor powered vehicles such as, for example, transit cars and locomotives. For purpose of illustration, the invention is described herein as it may be applied to a locomotive. The propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15a and 15b which inverts the DC power to AC power at a selectable variable frequency. The AC power is electrically coupled in energizing relationship to each of a plurality of adjustable speed AC traction motors 1–4 (M1 through M4). Prime mover 11, alternator 12, rectifier bridge 13 and inverters 15a, 15b are mounted on a platform of the traction vehicle 10, such as a four-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors 1–4 (M1–M4) is hung on a separate axle and its rotor is mechanically coupled, via conventional gearing, in driving relationship to the associated axle-wheel set. In the illustrative embodiment, the two motors 1 (M1) and 2 (M2) are electrically coupled in parallel with one another and receive power from inverter 15a while motors 3 (M3) and 4 (M4) are coupled to inverter 15b. However, in some instances, it may be desirable to provide an inverter for each motor or to couple additional motors to a single inverter. Suitable current transducers 27 and voltage transducers 29 are used to provide a family of current and voltage feedback signals, respectively, representative of the magnitudes of current and voltage in the motor stators. As suggested above, speed sensors, such as tachometers and the like, have been generally used to provide speed signals representative of the rotational speeds of the motor shafts. However, in accordance with the present invention, controller 26 includes a processor system 100, which as will be described in further detail in the context of FIG. 2, allows for providing motor excitation frequency control without having to use speed information from the speed sensor while providing effective wheel slip control. For simplicity of illustration, only single lines have been indicated for power flow although it will be apparent that the motors 1–4 (M1–M4) are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator command (throttle 36) for vehicle speed by the controller 26 which is in turn responsive to a speed signal estimate calculated by processor system 100. The controller 26 converts the speed command to a corresponding torque command for use in controlling the motors 1–4 (M1–M4). Since AC motor torque is proportional to rotor current and air gap flux, these quantities may be monitored; or more commonly, other quantities such as applied voltage, stator current and motor RPM may be used to reconstruct motor torque in controller 26. A more detailed analysis of such techniques is given in U.S. Pat. No. 4,243,927 and in a paper published in *IEEE Transactions on Industry Applications*, Vol. IA-13, No. 1, January 1977, entitled "Inverter-Induction Motor Drive For Transit Cars," by Plunkett and Plette.

Figure 2:
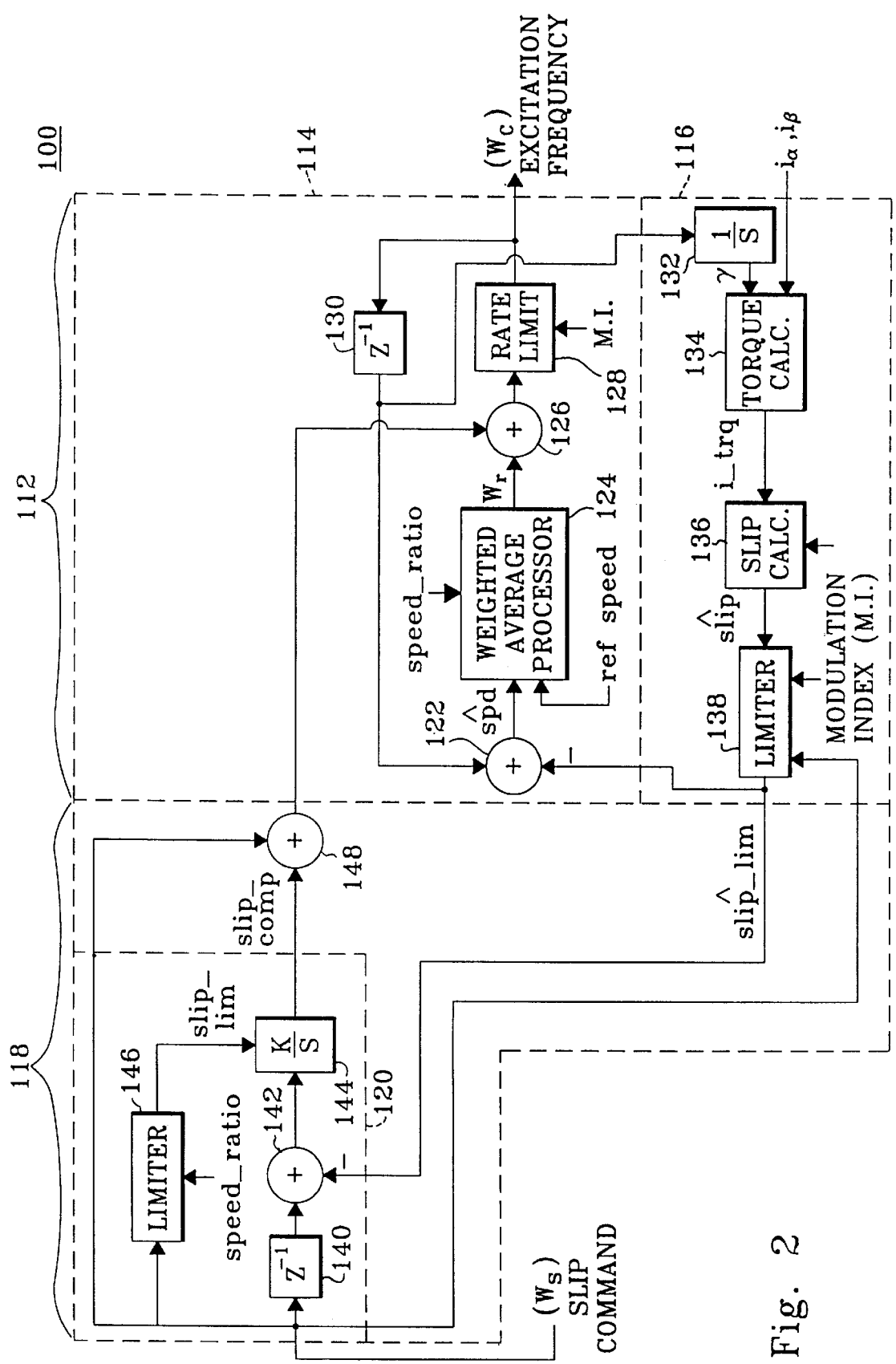
FIG. 2 shows an exemplary embodiment of a processor system in accordance with preferred embodiments of the present invention.

FIG. 2 shows an embodiment of processor system 100.

As suggested above, processor system 100 is designed to provide motor excitation frequency control to a respective one of the electric traction motors. It will be appreciated that additional processor systems 100 will be used for providing respective motor excitation frequency control to other electric traction motors used in the vehicle. For example, in the propulsion system of FIG. 1, four processor systems 100 will be used for providing respective motor excitation frequency control to motors 1–4 (M1 through M4). Processor system 100 is further designed to provide effective wheel slip control without using sensors, such as electromechanical sensors, coupled to measure rotational speeds of the traction motors. As shown in FIG. 2, processor system 100 includes a processor module 112 made up of a first processor submodule 114 designed to compute an excitation frequency signal which is based on a sum of (i) a signal indicative of a weighted average of an estimated rotor speed signal and a measured vehicle speed signal, and (ii) a suitably compensated slip command signal. Processor module 112 is further made up of a second processor submodule 116 for computing an estimated slip signal which is based on measured motor currents signals and the excitation frequency signal computed by first processor submodule 114. Processor system 100 further includes a slip compensation module 118 which is coupled to receive a slip command signal which may be generated externally to processor system 100 in controller 26 using techniques well known to those skilled in the art. Compensation module 118 is further coupled to processor module 112 to supply the compensated slip command signal. Compensation module 118 includes a submodule 120 for computing a slip compensation signal based on the estimated slip signal from second processor submodule 116 and the slip command signal.

It will be appreciated that although the foregoing processor system will now be described in terms of hardware components, such processor need not be limited to such hardware implementation since the operational relationships described herein may be readily implemented using software subroutines as may be readily executed in a suitable microprocessor unit. Thus, such operational relationships may be readily implemented using discrete or digitized signals and the operation of the system may be an iterative computational process. As shown in FIG. 2, first processor submodule 114 includes a subtractor 122 for receiving a last-computed value of the excitation frequency signal as a minuend input signal, and for receiving a bounded slip estimate signal as a subtrahend input signal to produce a difference output signal. A weighted average processor 124 receives the measured vehicle speed signal and the difference output signal from subtractor 122 to produce the weighted average signal in accordance with a predetermined weighting average equation. As will be appreciated by those skilled in the art, the measured vehicle speed signal may be obtained from one or more sensors available in the locomotive for measuring the ground speed of the locomotive. Example of such sensors may include radar, a global positioning system, or speed sensors connected to other axles in the vehicle, such as axles not necessarily propelled by the traction motors. A summer 126 has first and second inputs for receiving at the first input the weighted average signal from weighted average processor 124, and at the second input summer 126 receives the compensated slip command signal to produce a combined output signal. A limiter 128 receives the combined output signal from summer 126 to selectively bound the combined output signal to a predetermined rate of change based on a modulation index value. The modulation index refers to a numerical index which may vary from zero % to 100% depending on the ratio of the magnitude of a given AC motor voltage demand relative to the available voltage on the DC link. If, for example, the modulation index value is greater than about 80%, then a predetermined rate limit may be imposed by limiter 128 to the combined output signal from summer 126. Otherwise, no rate limit may be applied by limiter 128 to the combined output signal from summer 126. The output signal of limiter 128 represents a present value of the excitation frequency signal. A delay unit 130 receives the present value of the excitation frequency signal to supply an output signal which is the last-computed value of the excitation frequency signal which is received by subtractor 122.

Second processor submodule 116 is made up of an integrator 132 which receives the output signal from delay unit 130 to supply an output signal which represents a spatial rotation angle $\gamma$ induced by the excitation frequency signal. Torque calculator 134 receives the measured motor current signals $i_\alpha$ and $i_\beta$ and the output signal indicative of angle $\gamma$ from integrator 132 and computes a value of an estimated torque producing current signal based on the following equation: $i\_trq$-$i_\alpha(\sin\gamma)$-$i_\beta(\cos\gamma)$, wherein $i\_trq$ represents the estimated torque producing current signal, $i_\alpha$ and $i_\beta$ represent respective motor currents that may be readily obtained upon performing a suitable coordinate transformation from a 3-phase system representation to a 2-phase representation, and spatial rotation angle $\gamma$ represents the output signal from integrator 132. It will be appreciated by those skilled in the art that the estimated torque-producing current may be readily used to compute an accurate estimate of motor torque, provided motor flux is steady. Slip calculator 136 in turn receives the estimated torque producing current signal from torque calculator 134 to provide an estimated slip signal based on the following equation:

$$\hat{w}_s = \frac{i\_trq \times R_R}{flux}, \text{ wherein } \hat{w}_s$$

represents the estimated slip signal, $i\_trq$ represents the estimated torque producing current signal, flux represents a motor flux command, and $R_R$ represents an estimate of rotor resistance. Limiter 138 receives the estimated slip signal from slip calculator 136 and further receives the slip command signal to bound the estimated slip signal about a present value of the received slip command signal and further bound the estimated slip signal between predetermined respective limits which are selected based on the modulation index value. For example, if the modulation index is less than 70%, then the estimated slip signal may be limited to about the value of the slip command signal and within a first predetermined range. Otherwise, the estimated slip signal may be limited to about the value of the slip command signal and within a predetermined second range, wherein the first range is chosen to be sufficiently larger relative to the second range. The output signal from limiter 138 represents the bounded slip estimate signal which is supplied to subtractor 122. Submodule 120 in compensation module 118 includes a delay unit 140 which receives the slip command signal to supply a delayed slip command signal. A subtractor 142 receives the delayed slip command signal as a minuend input signal and receives the bounded slip estimate signal as a subtrahend signal to produce a difference output signal. An integrator 144, which has a predetermined multiplier or scale factor, receives the difference output signal from subtractor 142 and further receives a bounded slip command signal to supply at its output a slip command compensation signal. A limiter 146 receives the slip command signal to selectively bound the slip command signal between predetermined limits based on a speed ratio value. For example, if the speed ratio value is less than about 70%, then the limit imposed by limiter 146 may be chosen to be about ¾ of the value of the slip command signal. Otherwise, the limit imposed by limiter 146 may be chosen to be about ½ of the value of the slip command signal. As will be discussed in greater detail in the context of FIG. 3, the speed ratio value is also supplied to weighted average processor 124 for computing the weighted average signal. The output signal from limiter 146 represents the bounded slip command signal which is supplied to integrator 144. Compensation module 118 further includes a summer 148 that has first and second inputs. Summer 148 receives at the first input the slip command signal, and at the second input the slip command compensation signal to produce a combined output signal which is the compensated slip command signal supplied to summer 126.

Figure 3:
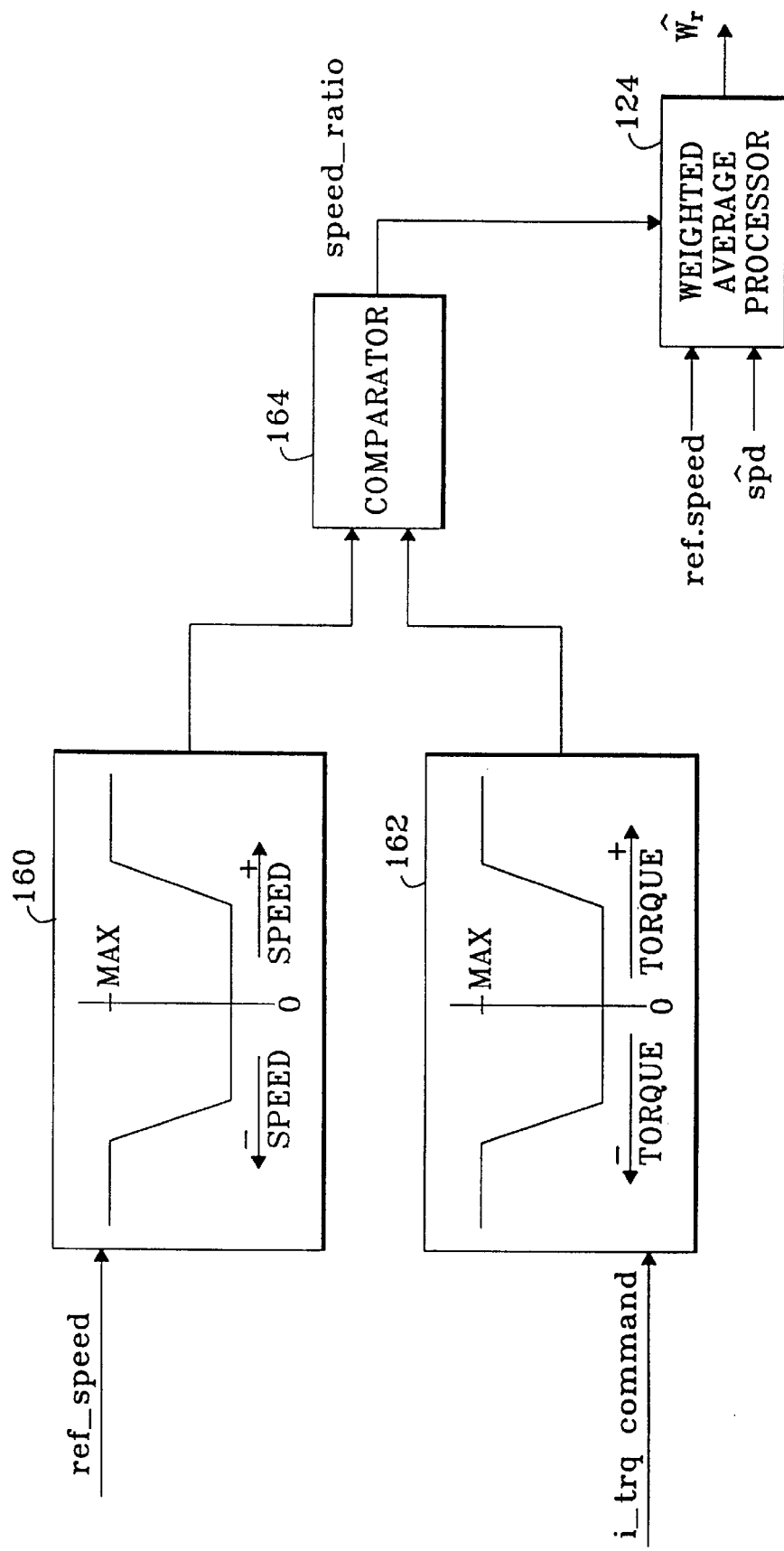
FIG. 3 shows exemplary look-up tables which may be used by the processor system of FIG. 2.

FIG. 3 shows a first look-up table 160 designed to supply a respective value between zero and a predetermined maximum value that may be conveniently chosen to be equal to one or less. Within the block diagram that represents look-up table 160 there is an exemplary graphical relationship for determining an output value of look-up table 160 as a function of the value of the measured vehicle speed signal. For example, for vehicle speed values ranging from a predetermined negative value to a predetermined positive value, the output value from look-up table 160 may be zero. For vehicle speed values beyond the foregoing range, the respective value supplied by look-table 160 may first change linearly as a function of the value of the vehicle speed signal from zero to the maximum value. Once the maximum value is reached, the output value from look-table 160 may remain at the predetermined maximum value independently of any further positive or negative increases in the value of the vehicle speed signal.

FIG. 3 further shows a second look-up table 162 designed to supply a respective value between zero and a predetermined maximum value that also may be conveniently chosen equal to one or less. Within the block diagram that represents look-up table 162 there is an exemplary graphical relationship for determining an output value of look-up table 162 as a function of the present value of a torque command signal. The torque command signal may be readily generated by controller 100 (FIG.1) using techniques well known to those skilled in the art. For example, when the torque command signal has values ranging from a predetermined negative value to a predetermined positive value, the output value from look-up table 162 may be zero. For torque command signal values beyond the foregoing range, the respective value supplied by look-table 162 may first change linearly as a function of the value of the torque command signal from zero to the maximum value. Once the maximum value is reached, the output value from look-table 162 may remain at the predetermined maximum value independently of any further positive or negative increases in the value of the torque command signal. A comparator 164 is connected to receive or retrieve the respective output values from look-up tables 160 and 162 to supply an output value that is the lowest of the two respective values received by comparator 140 and designated as speed_ratio. As suggested above, the comparator output value represents the speed ratio value that is passed to weighted average processor 124 to compute the weighted average speed signal based on the following equation:

$$\hat{W}_r = (\text{ref\_speed})(1-\text{speed\_ratio}) + (\hat{\text{spd}})(\text{speed\_ratio}),$$

wherein $\hat{W}_r$ represents the weighted average signal, ref_speed represents the measured vehicle speed signal, $\hat{\text{spd}}$ represents the estimated rotor speed signal and speed_ratio represents the speed ratio value.

It will be understood that the specific embodiments of the invention shown and described herein are exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A processor system for providing motor excitation frequency control in a vehicle having wheels propelled by AC electric traction motors respectively energized by one or more motor drives, the system comprising:

a processor module comprising a first processor submodule for computing an excitation frequency signal respectively supplied to the one or more motor drives, the excitation frequency signal based on a sum of i) a signal indicative of a weighted average of an estimated rotor speed signal and a measured vehicle speed signal, and ii) a compensated slip command signal, the processor module further comprising a second processor submodule for computing an estimated slip signal based on respective measured motor current signals and the excitation frequency signal; and a slip compensation module coupled to receive a slip command signal and further coupled to the processor module to supply the compensated slip command signal, the slip compensation module comprising a submodule for computing a slip compensation signal based on the estimated slip signal and the slip command signal.

2. The processor system of claim 1 wherein the first processor submodule comprises:

a subtractor for receiving a last-computed value of the excitation frequency signal as a minuend input signal and for receiving a bounded slip estimate signal as a subtrahend signal, the subtractor providing a difference output signal therefrom;

a weighted average processor for receiving the measured vehicle speed signal and the difference output signal from the subtractor to produce the weighted average signal in accordance with a predetermined weighting average equation;

a summer having first and second inputs, the summer coupled to receive at the first input the weighted average signal, and at the second input the compensated slip command signal to produce a combined output signal;

a rate limiter coupled to receive the combined output signal from the summer to bound the combined output signal to a predetermined rate based on a modulation index value, the output signal of the limiter constituting a present value of the excitation frequency signal; and a delay unit coupled to receive the present value of the excitation frequency signal to supply an output signal which is the last-computed value of the excitation frequency signal received by the subtractor.

3. The processor system of claim 2 wherein the second processor submodule comprises:

an integrator coupled to receive the output signal from the delay unit to supply an integrator output signal;

a torque calculator coupled to receive the respective measured motor current signals and the output signal from the integrator to supply an estimated torque producing current signal;

a slip calculator coupled to receive the estimated torque producing current signal to provide an estimated slip signal; and a limiter coupled to respectively receive the estimated slip signal from the slip calculator, and the slip command signal to bound the estimated slip signal about a present value of the received slip command signal and between predetermined respective limits being selected based on the modulation index value, the output signal of this last-recited limiter being the bounded slip estimate signal supplied to the subtractor.

4. The system of claim 3 further comprising first and second look-up tables, the first look-up table adapted to supply a respective value based on a present value of the vehicle speed signal, and the second look-up table adapted to supply a respective value based on a present value of an externally derived torque command signal.

5. The system of claim 4 further comprising a comparator coupled to receive the respective values from the first and second look-up tables, the comparator further coupled to the weighted average processor for supplying a comparator output value which is the lowest of the respective values from the first and second look-up tables.

6. The system of claim 5 where the predetermined weighting average equation is:

$$\hat{W}_r = (\text{ref\_speed})(1-\text{speed\_ratio}) + (\text{s}\hat{\text{p}}\text{d})(\text{speed\_ratio})$$

and wherein $\hat{W}_r$ represents the weighted average signal, ref_speed represents the measured vehicle speed signal, sp̂d represents the estimated rotor signal and speed_ratio represents the comparator output value.

7. The system of claim 1 wherein the submodule in the compensation module comprises:

a delay unit coupled to receive the slip command signal to supply a delayed slip command signal;

a subtractor for receiving the delayed slip command signal as a minuend input signal and for receiving the bounded slip estimate signal as a subtrahend signal, the subtractor adapted to produce a difference output signal;

an integrator with a predetermined scale factor for receiving the difference output signal and a bounded slip command signal to supply at its output a slip command compensation signal; and a limiter coupled to receive the slip command signal to selectively bound the slip command signal between predetermined respective limits based on the comparator output value, the output from this limiter constituting the bounded slip command signal supplied to the integrator with the predetermined scale factor.

8. The system of claim 7 wherein the compensation module further comprises:

a summer having first and second inputs, the summer coupled to receive at the first input the slip command signal, and at the second input the slip command compensation signal to produce a combined output signal which is the compensated slip command signal supplied to the summer in the first processor submodule.

9. A method for controlling motor excitation frequency in a vehicle having wheels propelled by AC electric traction motors respectively energized by one or more motor drives, the method comprising the steps of:

computing an excitation frequency signal respectively supplied to the one or more motor drives, the excitation frequency signal based on a sum of I) a signal indicative of a weighted average of an estimated rotor speed signal and a measured vehicle speed signal, and ii) a compensated slip command signal;

computing an estimated slip signal based on respective measured motor current signals and the excitation frequency signal; and computing a slip compensation signal based on a received slip command signal and the estimated slip signal.

10. The method of claim 9 wherein the step of computing the excitation frequency signal comprises:

receiving a last-computed value of the excitation frequency signal as a minuend input signal and further receiving a bounded slip estimate signal as a subtrahend signal to produce a difference output signal;

processing the measured vehicle speed signal and the difference output signal to produce the weighted average signal based on a predetermined weighting equation;

providing a combined output signal from the weighted average signal and the compensated slip command signal;

bounding the combined output signal to a predetermined rate based on a modulation index value to provide a present value of the excitation frequency signal; and delaying the present value of the excitation frequency signal to supply an output signal which is the last-computed excitation frequency signal received by the subtractor.

11. The method of claim 10 wherein the step of computing the estimated slip signal comprises:

integrating the delayed excitation frequency signal to supply an integrated signal;

calculating an estimated torque producing current signal based on the respective measured motor current signals and the integrated signal;

receiving the estimated torque producing current signal and a flux command signal to calculate an estimated slip signal; and bounding the estimated slip signal about a value of the slip command signal and between predetermined respective limits being selected based on the modulation index value to provide the bounded slip estimate signal supplied to the subtractor.

12. The method of claim 10 further comprising:

retrieving a respective value from a first look-up table based on the value of the measured vehicle speed signal; and retrieving a respective value from a second look-up table based on the value of an externally derived torque command signal.

13. The method of claim 12 further comprising:

comparing the respective values retrieved from the first and second look-up tables to select the lowest of the two retrieved values.

14. The method of claim 13 wherein the predetermined weighting average equation is:

$$\hat{W}_r = (\text{ref\_speed})(1 - \text{speed\_ratio}) + (\hat{\text{spd}})(\text{speed\_ratio})$$

and wherein $\hat{W}_r$ represents the weighted average signal, ref_speed represents the measured vehicle speed signal, $\hat{\text{spd}}$ represents the estimated rotor speed signal and speed_ratio represents the lowest of the two retrieved values.

15. The method of claim 9 wherein the step of computing the slip compensation signal comprises:

delaying the received slip command signal to supply a delayed slip command signal;

providing a subtractor for receiving the delayed slip command signal as a minuend input signal and for receiving the bounded slip estimate signal as a subtrahend input signal to produce a difference output signal;

passing a bounded slip command signal and the difference output signal through an integrator having a predetermined scale factor to supply a slip command compensation signal; and bounding the slip command signal between predetermined respective limits being selected based on the speed ratio value to provide the bounded slip command signal supplied to the integrator having a predetermined multiplier factor.

16. A vehicle having a processor system for inhibiting wheel slip, the vehicle comprising:

one or more AC electric traction motors coupled to propel the wheels of the vehicle;

one or more motor drives coupled to energize the AC electric traction motors; and the processor system in turn comprising:

a processor module comprising a first processor submodule for computing an excitation frequency signal respectively supplied to the one or more motor drives, the excitation frequency signal based on a sum of i) a signal indicative of a weighted average of an estimated rotor speed signal and a measured vehicle speed signal, and ii) a compensated slip command signal, the processor module further comprising a second processor submodule for computing an estimated slip signal based on respective measured motor current signals and the excitation frequency signal; and a slip compensation module coupled to receive a slip command signal and further coupled to the processor module to supply the compensated slip command signal, the slip compensation module comprising a submodule for computing a slip compensation signal based on the estimated slip signal and the slip command signal.

17. The vehicle of claim 16 wherein the first processor submodule comprises:

a subtractor for receiving a last-computed value of the excitation frequency signal as a minuend input signal and for receiving a bounded slip estimate signal as a subtrahend signal, the subtractor providing a difference output signal therefrom;

a weighted average processor for receiving the measured vehicle speed signal and the difference output signal from the subtractor to produce the weighted average signal in accordance with a predetermined weighting average equation;

a summer having first and second inputs, the summer coupled to receive at the first input the weighted average signal, and at the second input the compensated slip command signal to produce a combined output signal;

a rate limiter coupled to receive the combined output signal from the summer to bound the combined output signal to a predetermined rate based on a modulation index value, the output signal of the limiter constituting a present value of the excitation frequency signal; and a delay unit coupled to receive the present value of the excitation frequency signal to supply an output signal which is the last-computed value of the excitation frequency signal received by the subtractor.

18. The vehicle of claim 17 where in the second processor submodule comprises:

an integrator coupled to receive the output signal from the delay unit to supply an integrator output signal;

a torque calculator coupled to receive the respective measured motor current signals and the output signal from the integrator to supply an estimated torque producing current signal;

a slip calculator coupled to receive the estimated torque producing current signal to provide a n estimated slip signal; and a limiter coupled to respectively receive the estimated slip signal from the slip calculator, and the slip command signal to bound the estimated slip signal about a present value of the received slip command signal and between predetermined respective limits being selected based on the modulation index value, the output signal of this last-recited limiter being the bounded slip estimate signal supplied to the subtractor.

19. The vehicle of claim 18 further comprising first and second look-up tables, the first look-up table adapted to supply a respective value based on a present value of the vehicle speed signal, and the second look-up table adapted to supply a respective value based on a present value of an externally derived torque command signal.

20. The vehicle of claim 19 further comprising a comparator coupled to receive the respective values from the first and second look-up tables, the comparator further coupled to the weighted average processor for supplying a comparator output value which is the lowest of the respective values from the first and second look-up tables.

21. The vehicle of claim 20 where the predetermined weighting average equation is:

$$\hat{W}_r = (\text{ref\_speed})(1-\text{speed\_ratio}) + (\hat{\text{spd}})(\text{speed\_ratio})$$

and wherein $\hat{W}_r$ represents the weighted average signal, ref_speed represents the measured vehicle speed signal, $\hat{\text{spd}}$ represents the estimated rotor signal and speed_ratio represents the comparator output value.

22. The vehicle of claim 16 wherein the submodule in the compensation module comprises:

a delay unit coupled to receive the slip command signal to supply a delayed slip command signal;

a subtractor for receiving the delayed slip command signal as a minuend input signal and for receiving the bounded slip estimate signal as a subtrahend signal, the subtractor adapted to produce a difference output signal;

an integrator with a predetermined scale factor for receiving the difference output signal and a bounded slip command signal to supply at its output a slip command compensation signal; and a limiter coupled to receive the slip command signal to selectively bound the slip command signal between predetermined respective limits based on the comparator output value, the output from this limiter constituting the bounded slip command signal supplied to the integrator with the predetermined scale factor.

23. The vehicle of claim 22 wherein the compensation module further comprises:

a summer having first and second inputs, the summer coupled to receive at the first input the slip command signal, and at the second input the slip command compensation signal to produce a combined output signal which is the compensated slip command signal supplied to the summer in the first processor submodule.

* * * * *